(12) United States Patent
Takashimada et al.

(10) Patent No.: US 11,496,719 B2
(45) Date of Patent: Nov. 8, 2022

(54) PROJECTOR INCLUDING A SEMICONDUCTOR LIGHT EMITTING ELEMENT AND A COLOR WHEEL, PROJECTION CONTROL DEVICE, AND STORAGE MEDIUM

(71) Applicant: CASIO COMPUTER CO., LTD., Tokyo (JP)

(72) Inventors: Yubi Takashimada, Ome (JP); Tetsuro Narikawa, Hamura (JP); Kiyoshi Oda, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/824,938

(22) Filed: Mar. 20, 2020

(65) Prior Publication Data

US 2020/0326614 A1 Oct. 15, 2020

(30) Foreign Application Priority Data

Apr. 10, 2019 (JP) .............................. JP2019-074718

(51) Int. Cl.
*H04N 9/31* (2006.01)
*G03B 21/20* (2006.01)

(52) U.S. Cl.
CPC ......... *H04N 9/3155* (2013.01); *G03B 21/204* (2013.01); *G03B 21/206* (2013.01);
(Continued)

(58) Field of Classification Search
CPC .............. G03B 21/2013; G03B 21/204; G03B 21/206; G03B 33/08; G03B 21/2053;
(Continued)

(56) References Cited

U.S. PATENT DOCUMENTS 6,573,951 B1 * 6/2003 Hewlett ............... H04N 5/7458
345/691
7,384,150 B2 * 6/2008 Prince .................. H04N 9/3111
353/31
(Continued)

FOREIGN PATENT DOCUMENTS

CN 103676427 A 3/2014
CN 107831631 A 3/2018
(Continued)

OTHER PUBLICATIONS

JPO; Application No. 2019-074718; Notice of Reasons for Refusal dated Mar. 18, 2021.
(Continued)

*Primary Examiner* — Bao-Luan Q Le
(74) *Attorney, Agent, or Firm* — Fitch, Even, Tabin & Flannery LLP

(57) ABSTRACT

A projector of the present invention includes a light source unit including a semiconductor light emitting element and a color wheel and emitting lights in first and second wavelength ranges in time division, a display device receiving light source light to form image light, a projection optical system for projecting the image light onto a projection target, a delay time setting module for shifting a start timing of a color mixing period when the lights in the first and second wavelength ranges are emitted in a mixed fashion in a spoke period of the color wheel during which emissions of the lights in the first and second wavelength ranges are switched over based on an index indicating a brightness of light from the light source unit, and a light source driving module for driving the light source unit based on a setting set by the delay time setting module.

6 Claims, 7 Drawing Sheets

(52) U.S. Cl.
CPC ..... *G03B 21/2013* (2013.01); *G03B 21/2053* (2013.01); *H04N 9/3114* (2013.01); *H04N 9/3158* (2013.01); *H04N 9/3164* (2013.01)

(58) Field of Classification Search
CPC .. H04N 9/3155; H04N 9/3164; H04N 9/3114; H04N 9/3158
See application file for complete search history.

(56) References Cited

U.S. PATENT DOCUMENTS

| | | | | |
|---|---|---|---|---|
| 8,021,001 | B2 * | 9/2011 | Iwanaga | H04N 1/6088 353/85 |
| 8,194,192 | B2 * | 6/2012 | Harada | H05B 41/2928 348/743 |
| 8,403,492 | B2 * | 3/2013 | Shibasaki | G03B 21/204 353/31 |
| 8,425,052 | B2 * | 4/2013 | Peeters | G03B 21/204 353/84 |
| 8,465,159 | B2 * | 6/2013 | Iwanaga | G03B 21/43 353/85 |
| 9,294,749 | B2 * | 3/2016 | Oda | H04N 9/3182 |
| 9,329,467 | B2 * | 5/2016 | Ozawa | G03B 21/2053 |
| 9,485,498 | B2 * | 11/2016 | Oda | H04N 13/398 |
| 9,927,686 | B2 * | 3/2018 | Narikawa | G03B 21/206 |
| 10,802,388 | B2 * | 10/2020 | Narikawa | G03B 21/2033 |
| 2005/0276471 | A1 * | 12/2005 | Shin | H04N 9/3182 382/162 |
| 2006/0268236 | A1 * | 11/2006 | Prince | H04N 9/3182 353/31 |
| 2007/0030294 | A1 * | 2/2007 | Sawyers | G09G 3/007 345/690 |
| 2007/0070296 | A1 * | 3/2007 | Iwanaga | H04N 9/3182 353/31 |
| 2008/0055493 | A1 * | 3/2008 | Hanano | H05B 45/40 349/9 |
| 2008/0136977 | A1 * | 6/2008 | Harada | H04N 9/312 348/759 |
| 2010/0315604 | A1 * | 12/2010 | Peeters | G03B 21/204 353/84 |
| 2010/0328554 | A1 * | 12/2010 | Shibasaki | H04N 9/3161 348/760 |
| 2011/0292098 | A1 * | 12/2011 | Iwanaga | H04N 1/6088 345/690 |
| 2012/0147335 | A1 * | 6/2012 | Iwanaga | G03B 21/43 353/31 |
| 2014/0063468 | A1 * | 3/2014 | Narikawa | H04N 9/3182 353/31 |
| 2014/0078271 | A1 * | 3/2014 | Oda | H04N 9/3111 348/56 |
| 2014/0176918 | A1 * | 6/2014 | Ozawa | G06F 1/3203 353/85 |
| 2018/0164668 | A1 * | 6/2018 | Narikawa | G03B 33/08 |

FOREIGN PATENT DOCUMENTS

| | | |
|---|---|---|
| JP | 2011-43719 A | 3/2011 |
| JP | 2012-128438 A | 7/2012 |
| JP | 2012-155268 A | 8/2012 |
| JP | 2013-88574 A | 5/2013 |
| JP | 2014-048542 A | 3/2014 |

OTHER PUBLICATIONS

CNIPA; Application No. 202010199513.5; Notification of First Office Action dated Jun. 3, 2021.

* cited by examiner

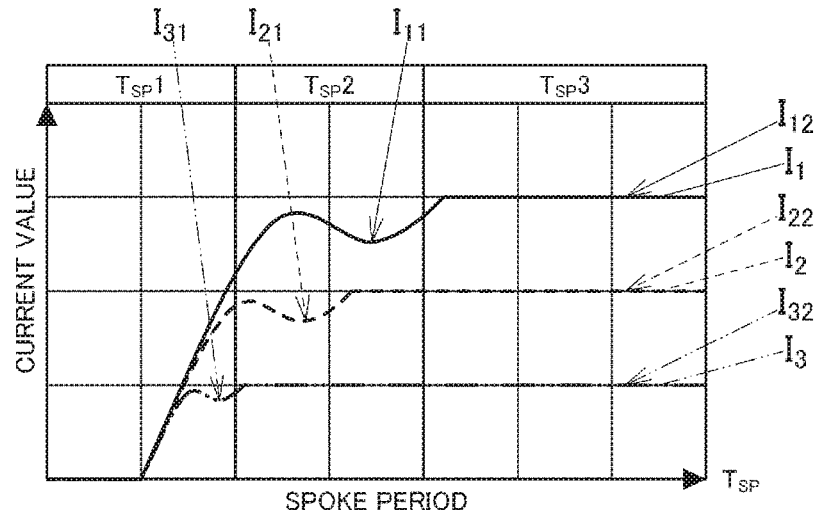
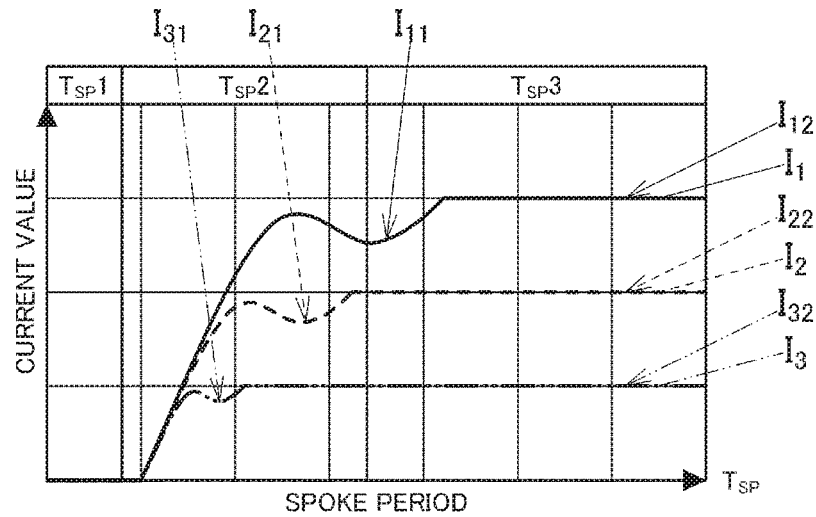
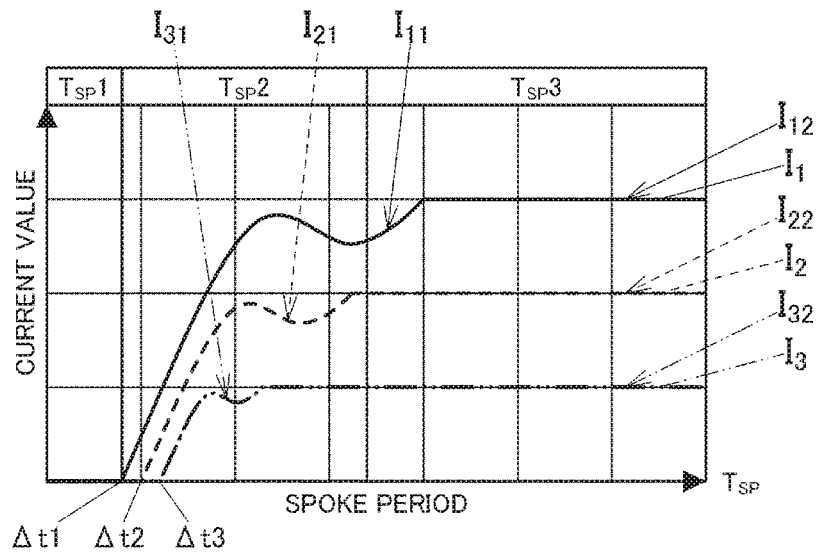

PROJECTOR INCLUDING A SEMICONDUCTOR LIGHT EMITTING ELEMENT AND A COLOR WHEEL, PROJECTION CONTROL DEVICE, AND STORAGE MEDIUM

CROSS-REFERENCE TO RELATED APPLICATION

This patent application is based upon and claims the benefit of priority under 35 USC 119 from Japanese Patent Application No. 2019-074718 filed on Apr. 10, 2019, the entire disclosure of which, including the specification, claims, drawings, and abstract thereof, is incorporated herein by reference in its entirety.

BACKGROUND OF THE INVENTION

Field of the Invention

The present invention relates to a projector, a projection control device, and a storage medium.

Description of the Related Art

Conventionally, there has been disclosed a projector in which a light source unit including light emitting devices configured to emit colors of light are driven in time division. For instance, in a projector disclosed in Japanese Patent Laid-Open No. 2012-155268, a spoke period is set as a time period during which colors of light from a light source unit are switched over. In the spoke period, colors of light are mixed up. Setting components of colors of light in the spoke period in advance can set a color mode in which the brightness of an image is enhanced or the chromaticity of the image is enhanced.

In colors of light that are mixed up in the spoke period, however, the light emitting amount of each light emitting device may vary, for example, as a result of the driving current of the light emitting device varying depending upon a color mode to be used. This may cause a discontinuous gradation in a gradational image.

SUMMARY OF THE INVENTION

The present invention has been made in view of the situations described above, and an object of the present invention is to provide a projector, a projection control device, and a storage medium that can hold gradation repeatability.

According to an aspect of the present invention, there is provided a projector including: a light source unit including a semiconductor light emitting element and a color wheel and configured to emit a plurality of colors of light including light in a first wavelength range and light in a second wavelength range in time division; a display device on to which light source light is shined from the light source unit to form image light; a projection optical system configured to project the image light emitted from the display device on to a projection target; a delay time setting module configured to shift a start timing of a color mixing period when the light in the first wavelength range and the light in the second wavelength range are emitted in a mixed fashion in a spoke period of the color wheel which constitutes a period when an emission of the light in the first wavelength range and an emission of the light in the second wavelength range are switched over based on an index indicating a brightness of light emitted from the light source unit; and a light source driving module configured to drive the light source unit based on a setting set by the delay time setting module.

According to another aspect of the present invention, there is provided a projection control device comprising: a delay time setting module configured to shift a start timing of a color mixing period when light in a first wavelength range and light in a second wavelength range are emitted in a mixed fashion in a spoke period of a color wheel which constitutes a period when an emission of the light in the first wavelength range and an emission of the light in the second wavelength range are switched over based on an index indicating a brightness of light emitted from a light source unit comprising a semiconductor light emitting element and the color wheel and configured to emit a plurality of colors of light including the light in the first wavelength range and the light in the second wavelength range in time division; and a light source driving module configured to drive the light source unit based on a setting set by the delay time setting module.

According to a further aspect of the present invention, there is provided a storage medium that a computer can read, the storage medium being configured to cause the computer to function as: a delay time setting module configured to shift a start timing of a color mixing period when light in a first wavelength range and light in a second wavelength range are emitted in a mixed fashion in a spoke period of a color wheel which constitutes a period when an emission of the light in the first wavelength range and an emission of the light in the second wavelength range are switched over based on an index indicating a brightness of light emitted from a light source unit comprising a semiconductor light emitting element and the color wheel and configured to emit a plurality of colors of light including the light in the first wavelength range and the light in the second wavelength range in time division; and a light source driving module configured to drive the light source unit based on a setting set by the delay time setting module.

BRIEF DESCRIPTION OF THE DRAWINGS

FIG. 6A is a chart showing rising waveforms of a blue laser diode according to the embodiment of the present invention, the waveforms showing waveforms resulting before a delay control is performed;

FIG. 6B is a chart showing rising waveforms of the blue laser diode according to the embodiment of the present invention, showing a state in which varying portions of the waveforms are set so as to lie close to a central portion of a spoke period;

FIG. 6C is a chart showing rising waveforms of the blue laser diode according to the embodiment of the present invention, the waveforms showing waveforms resulting after the delay control is performed.

DETAILED DESCRIPTION OF THE PREFERRED EMBODIMENT

Figure 1:
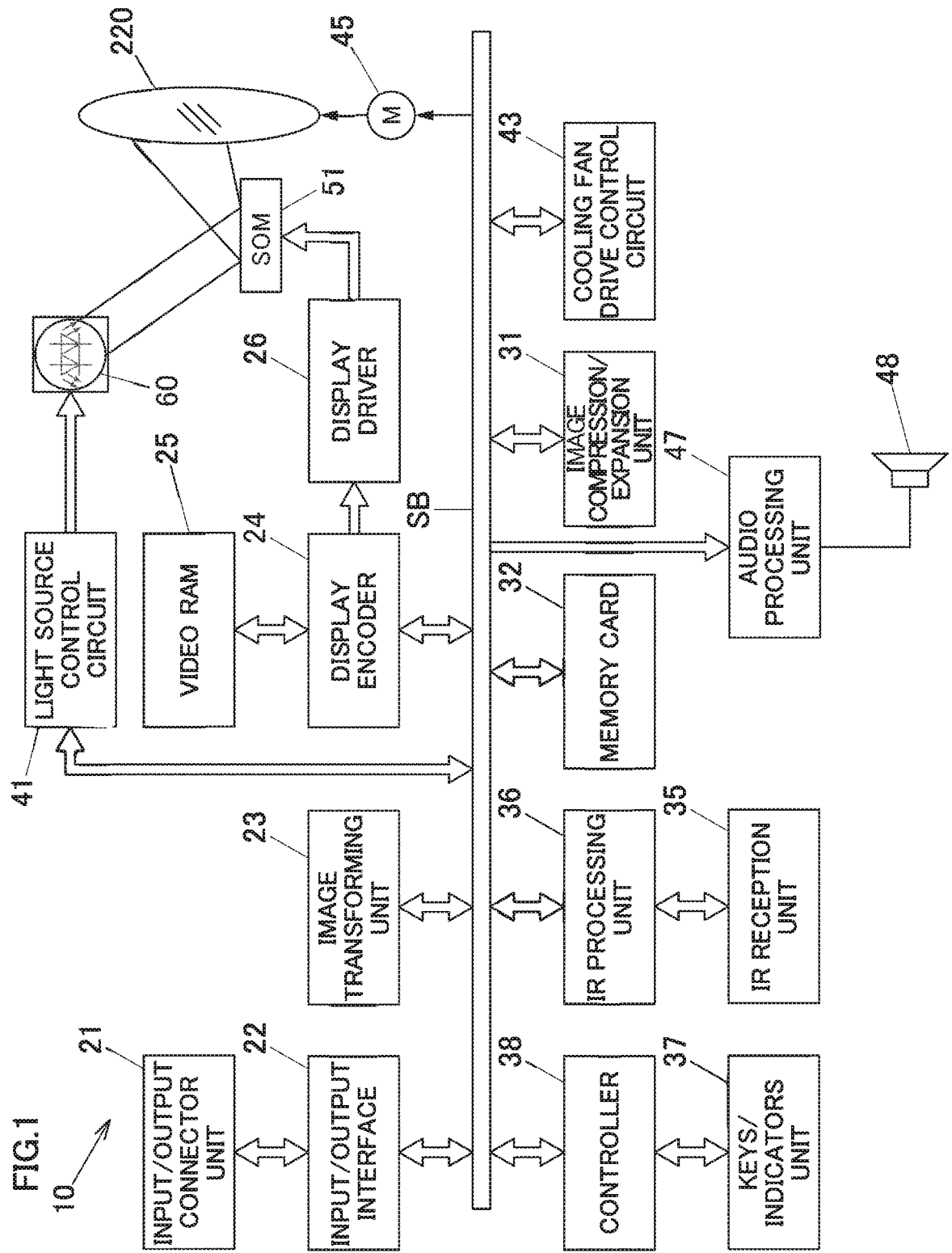
FIG. 1 is a functional circuit block diagram of a projector according to an embodiment of the present invention.

Hereinafter, referring to accompanying drawings, an embodiment of the present invention will be described. FIG. 1 is a functional block diagram of a projector 10 (a projection control device). The projector 10 includes a controller 38, an input/output interface 22, an image transforming unit 23, a display encoder 24, a display driver 26, and the like. Image signals of various standards which are inputted from an input/output connector unit 21 are sent to the image transforming unit 23 via the input/output interface 22 and a system bus (SB), and the image signals so sent are transformed to be unified into an image signal of a predetermined format which is suitable for display in the image transforming unit 23 by the projection control device. Thereafter, the unified image signal is outputted to the display encoder 24.

The controller 38 governs the control of operations of individual circuitries inside the projector 10 and includes CPU as an arithmetic-logic unit, ROM that stores fixedly operation programs such as various settings, RAM that is used as a work memory, and the like.

The display encoder 24 deploys the image signal inputted thereinto on a video RAM 25 for storage in it and generates a video signal from the contents stored in the video RAM 25, outputting the video signal so generated to the display driver 26.

The display driver 26 drives a display device 51, which is a spatial optical modulator (SOM), at an appropriate frame rate corresponding to the image signal outputted from the display encoder 24.

The projector 10 includes a light source unit 60 for emitting light having a wavelength in the blue wavelength range or simply light in the blue wavelength range, light having a wavelength in the green wavelength range or simply light in the green wavelength range (light in a first wavelength range), and light having a wavelength in the red wavelength range or simply light in the red wavelength range (light in a second wavelength range). Light emitted from the light source unit 60 is shined on to the display device 51 and is then reflected by the display device 51, forming image light. The image light formed by the reflection light from the display device 51 is projected on to a screen or the like by way of a projection optical system 220, which will be described later.

The projection optical system 220 includes a movable lens group. The movable lens group is driven by a lens motor 45 for zooming and focusing.

With the projector 10 set in a reproducing mode, an image compression/expansion unit 31 reads out image data recorded in a memory card 32 and expands the individual image data that makes up a series of dynamic images frame by frame. Additionally, the image compression/expansion unit 31 outputs the expanded image data to the display encoder 24 by way of the image transforming unit 23 and causes the display encoder 24 to display the dynamic images based on the image data stored in the memory card 32.

A keys/indicators unit 37 is provided on a casing of the projector 10. Operation signals from the keys/indicators unit 37 are sent out directly to the controller 38. Key operation signals from a remote controller are received by an IR reception unit 35 and are then demodulated at an Ir processing unit 36 for output to the controller 38.

An audio processing unit 47 is connected to the controller 38 by way of the system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41. The light source control circuit 41 controls the light source unit 60 in such a manner as to cause the light source unit 60 to emit light source light in predetermined wavelength ranges required in generating an image.

Additionally, the controller 38 can cause a cooling fan drive control circuit 43 to detect temperatures in light source unit 60 with a plurality of temperature sensors provided in the light source unit 60 and the like so as to control revolution speeds of cooling fans based on the results of the temperature detections. Further, the controller 38 can also cause the cooling fan drive control circuit 43 to keep the cooling fans revolving by use of a timer or the like even after a power supply to a main body of the projector 10 is switched off. Alternatively, the controller 38 can cause the cooling fan drive control circuit 43 to switch off the power supply of the main body of the projector 10 depending upon the results of the temperature detections by the temperature sensors.

Figure 2:
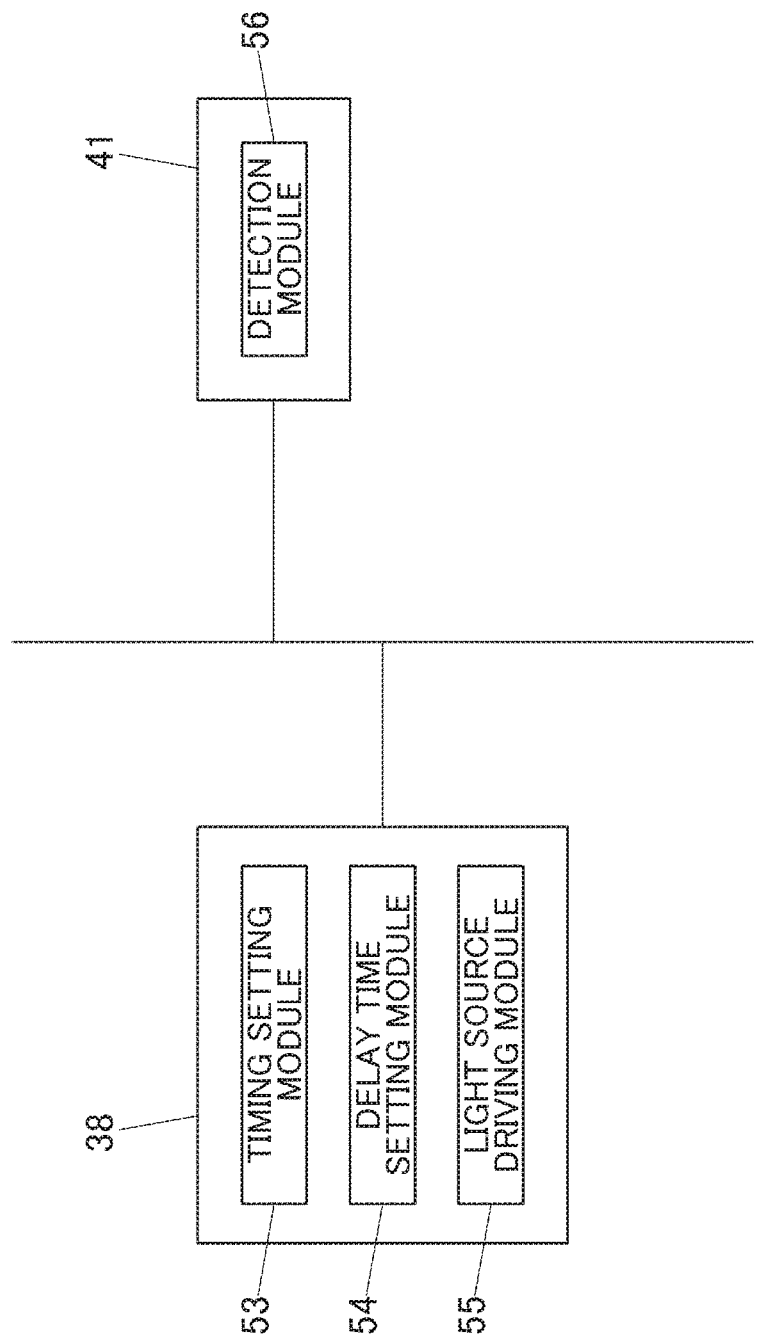
FIG. 2 is a functional circuit block diagram showing in detail a controller and a light source control circuit of the projector according to the embodiment of the present invention.

As shown in FIG. 2, the controller 38 of the projection control device, which is the projector 10 in this embodiment, includes a timing setting module 53, a delay time setting module 54, and a light source driving module 55. The light source control circuit 41 includes a detection module 56 configured to detect information on an amount of each color of light emitted from the projection optical system 220. These modules will be described in detail later.

Figure 3:
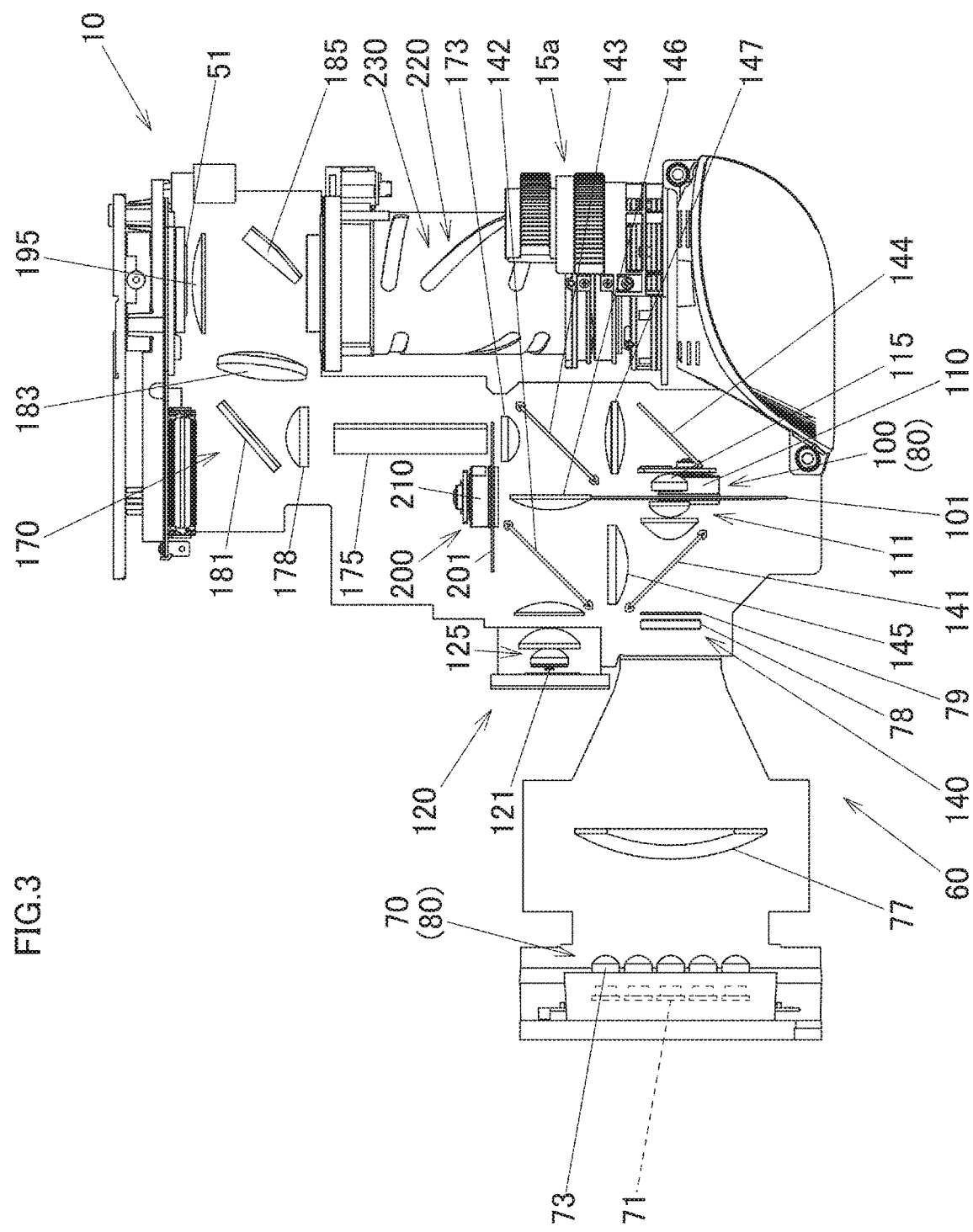
FIG. 3 is a schematic plan view showing an internal structure of a light source unit of the projector according to the embodiment of the present invention.

Next, referring to FIG. 3, an internal structure of the light source unit 60 of the projector 10 will be described. In the following description, when right and left directions are referred to in relation to the projector 10, they denote right and left directions with respect to a projecting direction of the projector 10, and when front and rear directions are referred to similarly, they denote front and rear directions with respect to a direction of the projector 10 towards a screen and a traveling direction of a pencil of light.

The light source unit 60 includes an excitation light shining device 70, which constitutes a light source for light in the blue wavelength range and also functions as an excitation light source, a green light source device 80, which constitutes a light source for light in the green wavelength range, a red light source device 120, which constitutes a light source for light in the red wavelength range, and a color wheel device 200. The green light source device 80 is made up of the excitation light shining device 70 and a luminescent wheel device 100.

A light guiding optical system 140 is disposed in the light source unit 60, and this light guiding optical system 140 guides lights in the red, green and blue wavelength ranges. The light guiding optical system 140 guides lights emitted, respectively, from the excitation light shining device 70, the green light source device 80, and the red light source device 120 to a light source optical system 170. The excitation light shining device 70 includes a plurality of blue laser diodes 71, which are semiconductor light emitting elements, collective lenses 77, 78, and a diffuse plate 79.

Collimator lenses 73 are disposed individually on optical axes of the blue laser diodes 71 to convert lights emitted from the corresponding blue laser diodes 71 into parallel lights in order to enhance the directivity of the lights so emitted. The collective lens 77 and the collective lens 78 collect pencils of light emitted from the blue laser diodes 71 in one direction and emit the pencils of light so contracted to the diffuse plate 79. The diffuse plate 79 transmits diffusely the pencils of light in the blue wavelength range which are incident thereon towards a first dichroic mirror 141 disposed on a side of the diffuse plate 79 that faces a luminescent wheel 101.

The luminescent wheel device 100 is disposed on an optical path of excitation light emitted from the excitation light shining device 70. The luminescent wheel device 100 includes the luminescent wheel 101, a motor 110, a collective lens group 111, and a collective lens 115. The luminescent wheel 101 is disposed in such a manner as to lie at right angles to an axis of light emitted from the excitation light shining device 70 so that a position on the luminescent wheel 101 constitutes a light shining position S (refer to FIG. 4A). The motor 110 is disposed below the collective lens group 111 and the collective lens 115 and drives the luminescent wheel 101 rotationally.

Figure 4A:
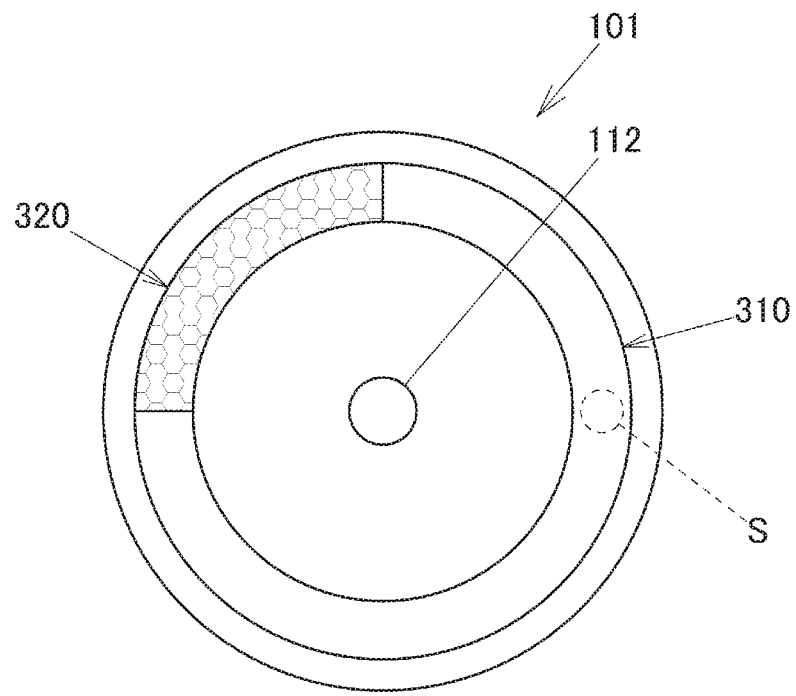
FIG. 4A is a schematic front view of a luminescent wheel of the light source unit of the projector according to the embodiment of the present invention.

The luminescent wheel 101 has a circular disk shape as shown in FIG. 4A and is fixed to the motor 110 at a bearing 112 provided at a central portion of the circular disk shape, whereby the luminescent wheel 101 is driven to rotate by the motor 110. The luminescent wheel 101 includes a luminescent light emitting area 310 and a transmission area 320 which are provided to be aligned end to end in a circumferential direction on the luminescent wheel 101. A metallic base material such as copper or aluminum can be used as a base material for the luminescent wheel 101. A surface of the base material that is oriented towards the excitation light shining device 70 is mirror finished through silver deposition or the like. A green luminescent material layer formed on the mirror finished surface of the base material is formed on the luminescent light emitting area 310. The luminescent light emitting area 310 receives light in the blue wavelength range emitted from the excitation light shining device 70 as excitation light and then emits luminescent light in the green wavelength range in every direction. One part of the luminescent light so emitted is emitted directly towards the collective lens group 111, while the other part of the luminescent light is reflected on a reflection surface of the luminescent wheel 101 to thereafter be emitted towards the collective lens group 111.

The transmission area 320 of the luminescent wheel 101 can be formed by fitting a transparent base material having a light transmission characteristic in a cut-out portion formed in the base material of the luminescent wheel 101. The transparent base material is formed of a transparent material such as glass or resin. Additionally, a diffuse layer may be provided on a surface of a side of the transparent base material on to which light in the blue wavelength range is shined or an opposite side thereto. The diffuse layer can be provided by forming minute irregularities on the relevant surface through sandblasting. Light in the blue wavelength range emitted from the excitation light shining device 70 to be incident on the transmission area 320 is transmitted or transmitted diffusely through the transmission area 320 and is then incident on the collective lens 115.

Returning to FIG. 3, the collective lens group 111 collects pencils of light in the blue wavelength range emitted from the excitation light shining device 70 to the luminescent wheel 101 and collects luminescent light emitted from the luminescent wheel 101. The collective lens 115 collects a pencil of light emitted from the luminescent wheel 101.

The red light source device 120 includes a red light emitting diode 121, which is a semiconductor light emitting device, disposed in such a manner as to be parallel to the axis of light emitted from the blue laser diodes 71 and a collective lens group 125 that collects light in the red wavelength range emitted from the red light emitting diode 121. The red light source device 120 is disposed in such a manner that an axis of light in the red wavelength range emitted from the red light emitting diode 121 intersects an axis of light in the green wavelength range emitted from the luminescent wheel 101 and reflected by the first dichroic mirror 141.

The light guiding optical system 140 includes the first dichroic mirror 141, a second dichroic mirror 142, a third dichroic mirror 143, collective lenses 145, 146, 147 that collect pencils of light, a reflection mirror 144 that turns axes of pencils of light into a single light axis, and the like. Hereinafter, the individual constituent members will be described.

The first dichroic mirror 141 is disposed between the diffuse plate 79 and the collective lens group 111. The first dichroic mirror 141 transmits light in the blue wavelength range towards the collective lens group 111 and reflects light in the green wavelength range in the direction of the collective lens 145 to thereby turn an axis of the light in the green wavelength range trough 90 degrees.

The second dichroic mirror 142 constitutes a combining device that combines light in the green wavelength range and light in the red wavelength range into the same light axis and reflects light in the green wavelength range, while transmitting light in the red wavelength range. Light in the green wavelength range that is reflected by the first dichroic mirror 141 is collected by the collective lens 145 and is then incident on the second dichroic mirror 142.

The light in the green wavelength range reflected by the second dichroic mirror 142 is collected by the collective lens 146 and is then incident on the third dichroic mirror 143 disposed on a light emerging side of the collective lens 146. The third dichroic mirror 143 reflects light in the red wavelength range and light in the green wavelength range and transmits light in the blue wavelength range. Consequently, the third dichroic mirror 143 reflects the light in the red wavelength range and the light in the green wavelength range that the collective lens 146 collects to the collective lens 173, so that the third dichroic mirror 143 guides the light in the red wavelength range and the light in the green wavelength range in the way described above.

When the light shining position S on the luminescent wheel 101 on to which light in the blue wavelength range is shined stays on the transmission area 320 (refer to FIG. 4A), light in the blue wavelength range emitted from blue laser diodes 71 is transmitted or transmitted diffusely through the luminescent wheel 101 and is then collected by the collective lens 115 to thereafter be guided to the reflection mirror 144. The reflection mirror 144 is disposed on an axis of light in the blue wavelength range that is transmitted or transmitted diffusely through the luminescent wheel 101. The reflection mirror 144 reflects light in the blue wavelength range and guides its light axis to the collective lens 147 by turning the light axis through 90 degrees. The third dichroic mirror 143 transmits the light in the blue wavelength range that is collected by the collective lens 147 to guide it towards a collective lens 173.

The light source optical system 170 includes the collective lens 173, alight tunnel 175, a collective lens 178, a light axis turning mirror 181, a collective lens 183, a shining mirror 185, and a condenser lens 195. The condenser lens 195 emits image light emitted from the display device 51 disposed on a rear side of the condenser lens 195 towards the projection optical system. 220, and therefore, the condenser lens 195 also constitutes part of the projection optical system 220.

The collective lens 173 is disposed at an end of the light tunnel 175 that lies to face the third dichroic mirror 143. The collective lens 173 collects light in the green wavelength range, light in the blue wavelength range and light in the red wavelength range that are guided from the third dichroic mirror 143. The lights in the green, blue and red wavelength ranges that are collected by the collective lens 173 are shined on to a color wheel 201 of the color wheel device 200.

The color wheel device 200 includes the color wheel 201 and a motor 210 that drives the color wheel 201 rotationally. The color wheel device 200 is disposed between the collective lens 173 and the light tunnel 175 in such a manner that an axis of a pencil of light emitted from the collective lens 173 is at right angles to a shining surface on the color wheel 201.

Figure 4B:
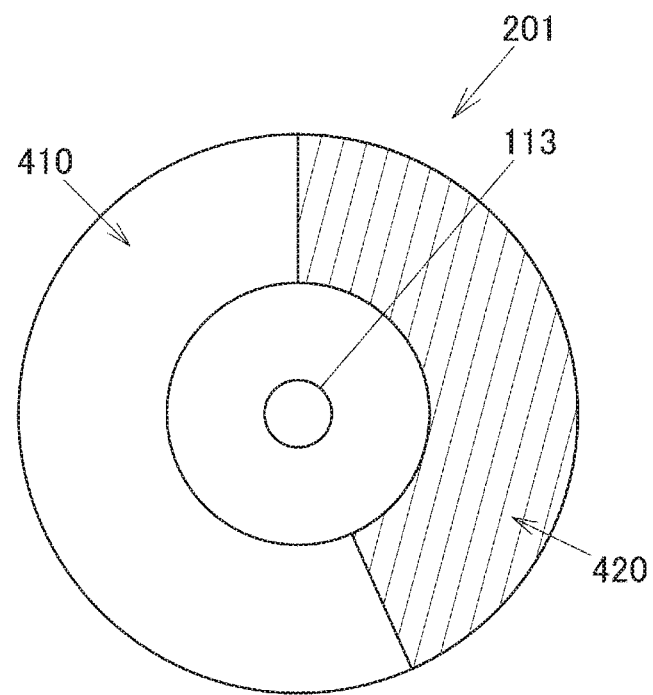
FIG. 4B is a schematic front view of a color wheel of the light source unit of the projector of the embodiment of the present invention.

The color wheel 201 has a circular disk shape as shown in FIG. 4B and is fixed to a shaft portion of the motor 210 at a bearing 113 provided at a central portion of the color wheel 201, whereby the color wheel 201 is driven rotationally by the motor 210. The color wheel 201 includes an all color transmission area 410 and a blue and red transmission area 420 that are provided end to end in a circumferential direction. The all color transmission area 410 is formed of transparent glass or a transparent resin plate and can transmit all of light in the blue wavelength range, light in the green wavelength range, and light in the red wavelength range. The blue and red transmission area 420 is formed by a color filter and can transmit light in the blue wavelength range and light in the red wavelength range. Light in the blue wavelength range, light in the green wavelength range, and light in the red wavelength range that are incident on the color wheel 201 are transmitted through the all color transmission area 410 or the blue and red transmission area 420 to be dimmed and are then guided towards the light tunnel 175 shown in FIG. 3. A pencil of light incident on the light tunnel 175 becomes a pencil of light whose luminous intensity is distributed uniformly within the light tunnel 175.

The collective lens 178 is disposed on an optical axis of the light tunnel 175 in a position to a rear end of the light tunnel 175. The light axis turning mirror 181 is disposed rearwards of the collective lens 178. A pencil of light emerging from an emerging port of the light tunnel 175 is collected at the collective lens 178 and is then reflected towards a left panel by the light axis turning mirror 181.

The pencil of light reflected by the light axis turning mirror 181 is collected by the collective lens 183, whereafter the pencil of light is shined onto the display device 51, which is a digital micromirror device (DMD), at a predetermined angle via the condenser lens 195 by the shining mirror 185.

The light source light shined on to an image forming plane of the display device 51 by the light source optical system 170 is reflected on the image forming plane of the display device 51 and is projected on to a screen via the projection optical system 220 as projected light. Here, the projection optical system 220 is made up of the condenser lens 195, and the movable lens group and a fixed lens group which are provided in a lens barrel 230. The movable lens group is configured as a variable-focus lens and can be adjusted for zooming and focusing. The movable lens group is made to move automatically by the lens motor 45 or manually by a projected image control unit 15a.

The luminescent wheel 101 and the color wheel 201 can be rotated in synchronization with each other by configuring the projector 10 in the way described heretofore, and when light is emitted at arbitrary timings individually from the excitation light shining device 70 and the red light source device 120, lights in the green, blue and red wavelength ranges are incident on the collective lens 173 via the light guiding optical system 140 and are then incident on the display device 51 via the light source optical system 170. As a result, the display device 51 displays green, blue and red lights in time division in accordance with data, thereby making it possible to project a color image on to the screen.

Figure 5:
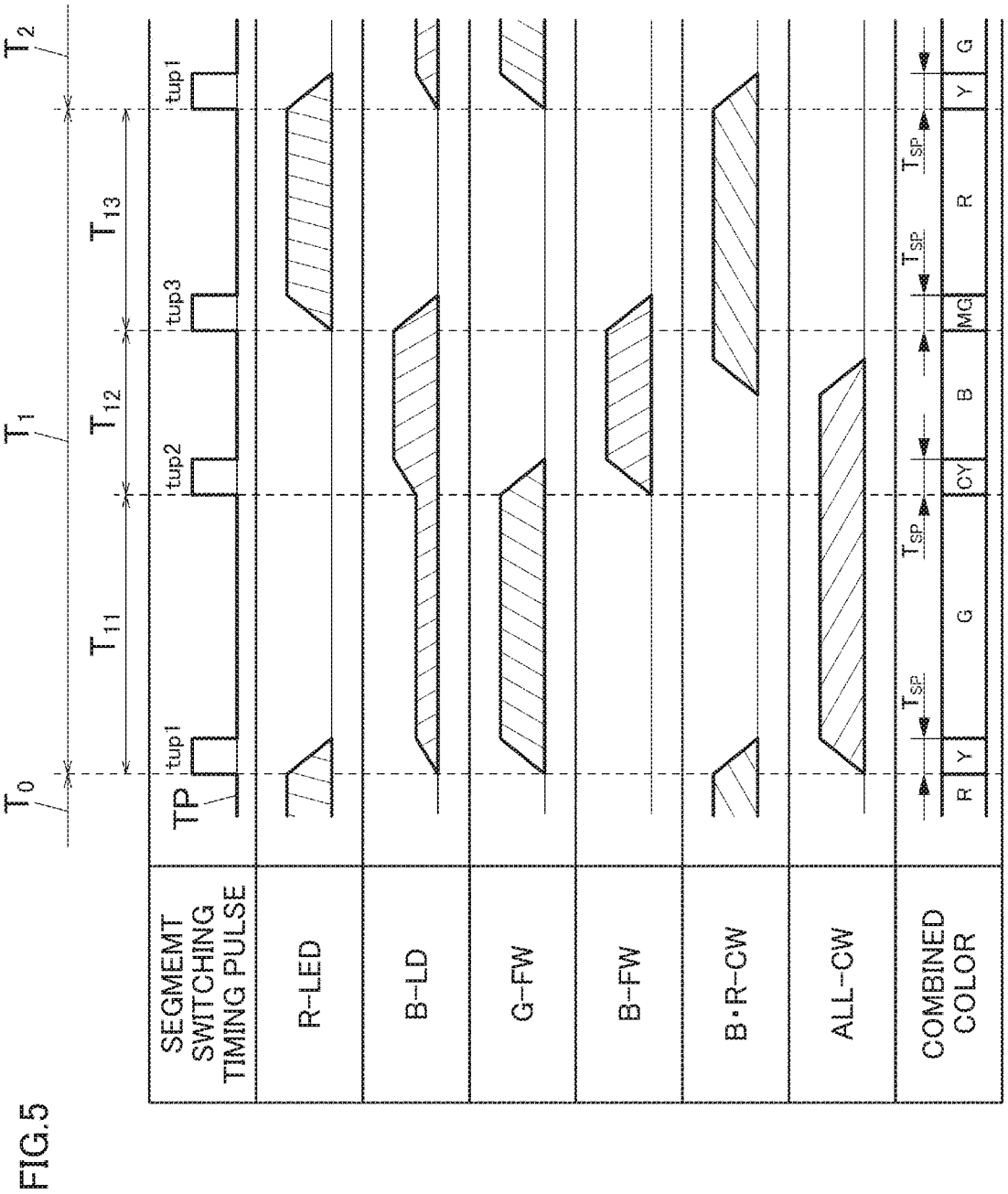
FIG. 5 is a timing chart of the projector according to the embodiment of the present invention.

FIG. 5 shows an example of a time chart in which the light source unit 60 emits a combined color of light source light by switching segments for light in the red wavelength range (R), light in the green wavelength range (G), and light in the blue wavelength range (B) in synchronism with a building-up timing tup (tup1, tup2, tup 3) of a segment switching timing pulse TP from the controller 38 within a period of a unit image frame T (T0, T1, T2, . . . ). In FIG. 5, the red light source device 120 (the red light emitting diode 121) is denoted by R-LED, the excitation light shining device 70 (the blue laser diode 71) is denoted by B-LD, the luminescent light emitting area 310 of the luminescent wheel device 100 (the luminescent wheel 101) is denoted by G-FW, the transmission area 320 of the luminescent wheel device 100 (the luminescent wheel 101) is denoted by B-FW, the blue and red transmission area 420 of the color wheel device 200 (the color wheel 201) is denoted by B•R-CW, and the all color transmission area 410 of the color wheel device 200 (the color wheel 201) is denoted by ALL-CW. Here, heights of the red light source device 120 (R-LED), the excitation light shining device 70 (B-LD), the luminescent light emitting area 310 (G-FW), the transmission area 320 (B-FW), the blue and red transmission area 420 (B•R-CW), and the all color transmission area 410 (ALL-CW) schematically denote amounts of light that they emit.

Additionally, a given time from the building-up timing tup (tup1, tup2, tup3) of the segment switching timing pulse TP is set as a spoke period Tsp. The timing tup and the spoke period Tsp are set by the timing setting module 53. In this embodiment, a mixed color of light is set so as to be emitted within the spoke period Tsp.

For example, in a period T11, the red light source device 120 (R-LED) that keeps illuminated from a previous period T0 is started to be turned off at a building-up timing tup1 of the segment switching timing pulse TP. Additionally, light in the blue wavelength range is started to be illuminated from the excitation light shining device 70 (B-LD). As a result, the luminescent light emitting area 310 receives the light in the blue wavelength range from the excitation light shining device 70 and starts to emit luminescent light in the green wavelength range. On the other hand, in the color wheel device 200, the blue and red transmission area 420 (B•R-CW) is switched to the all color transmission area 410 (ALL-CW). The light emitted from the excitation light shining device 70 (B-LD) is shined on to the luminescent light emitting area 310 (G-FW), causing the luminescent light emitting area 310 (G-FW) to emit luminescent light in the green wavelength range. However, a shining spot on to which light source light in the red wavelength range (a red component of light that is taken out as a result of light in the red wavelength range from the red light source device 120 (R-LED) and light in the green wavelength range from the luminescent light emitting area 310 (G-FW) passing through the blue and red transmission area 420) extends from the blue and red transmission area 420 (B•R-CW) to the all color transmission area 410 (ALL-CW), and a ratio of light in the red wavelength range varies. Consequently, an amount of light in the red wavelength range (a red component of light that is taken out as a result of light in the red wavelength range from the red light source device 120 (R-LED) and light in the green wavelength range from the luminescent light emitting area 310 (G-FW) passing through the blue and red transmission area 420) decreases, while an amount of light in the green wavelength range that passes through the all color transmission area 410 (ALL-CW) increases. As a result, in the spoke period Tsp in the period T11, light in the red wavelength range and light in the green wavelength range are mixed up to emit light in a yellow wavelength range (Y), and thus, the spoke period Tsp is referred to as a color mixing period when light in the yellow wavelength range (Y) is emitted. In the case that the spoke period for light in the yellow wavelength range (Y) is six degrees, it is desired that an amount of light in the red wavelength range emitted from the red light source device 120 (R-LED) at a point in time when the spoke period is three degrees is a half of an amount of light in the red wavelength range emitted from the red light source device 120 (R-LED) when the light source device is turned on. Then, the red light source device 120 (R-LED) is turned off completely after the spoke period Tsp in the period T11 is over, and the light transmission areas on the color wheel 201 are switched completely from the blue and red transmission area 420 (B•R-CW) to the all color transmission area 410 (ALL-CW). Then, light in the green wavelength range (G) is emitted from the light source unit 60.

In a period T12, a driving current of the excitation light shining device 70 (B-LD) is increased at a building-up timing tup2, whereby an amount of light in the blue wavelength range emitted from the excitation light shining device 70 (B-LD) is increased. On the other hand, in the luminescent wheel 101, the areas are switched from the luminescent light emitting area 310 (G-FW) to the transmission area 320 (B-FW). As a result, in a spoke period Tsp in the period T12, light in the blue wavelength range and light in the green wavelength range are mixed up to emit light in a cyan wavelength range (CY), and thus, the spoke period Tsp is referred to as a color mixing period when light in the cyan wavelength range is emitted. Light in the blue wavelength range (B) is emitted after the spoke period Tsp in the period T12 is over. The light transmission areas on the color wheel 201 are switched from the all color transmission area 410 (ALL-CW) to the blue and red transmission area 420 (B•R-CW) during the period when light in the blue wavelength range (B) is emitted (that is, during the period T12).

In a period T13, the red light source device 120 (R-LED) starts to be turned on at a building-up timing tup3. On the other hand, the excitation light shining device 70 (B-LD) starts to be turned off. As a result, in a spoke period Tsp in the period T13, light in the red wavelength range (light in the red wavelength range from the red light source device 120 (R-LED) and light in the blue wavelength range that passes through the transmission area 320 (B-FW) are mixed up to emit light in a magenta wavelength range (MG), and thus, the spoke period Tsp is referred to as a color mixing period. Light in the red wavelength range (R) is emitted after the spoke period Tsp is over.

In the time chart shown in FIG. 5, although the current value while the excitation light shining device 70 illuminates the luminescent light emitting area 310 is reduced, it may be set so that the current value while the excitation light shining device 70 illuminates the luminescent light emitting area 310 is increased and the current value while light from the excitation light shining device 70 is passed through the transmission area 320.

The projector 10 can provide a "brightness-stressed" color mode in which projected light is brightened by making use of, for example, light in the yellow wavelength range (Y) emitted during the spoke period Tsp in the period T11. Additionally, the projector 10 can provide a "color-stressed mode" in which a period when light in the red wavelength range is emitted is lengthened by causing light in the blue wavelength range to pass only through the all color transmission area 410 (ALL-CW) when the timing at which the light transmission areas on the color wheel 201 are switched from the all color transmission area 410 (ALL-CW) to the blue and red transmission area 420 (B•R-CW) in the period T12 is matched with the building-up timing tup3. In addition, various color modes can be set by controlling the amounts of light in the blue wavelength range and light in the red wavelength range by controlling the driving current values of the blue laser diodes 71 and the red light emitting diode 121.

Here, in a semiconductor light emitting element such as the red light emitting diode 121 and the blue laser diode 71, an amount of light emitted therefrom is gradually increased or decreased when the semiconductor light emitting element is turned on or a driving current thereof is increased or when the semiconductor light emitting diode is turned off or the driving current thereof is decreased. This is because although the semiconductor light emitting element is illuminated with an amount of light corresponding to a current value adopted, the semiconductor light emitting element has a characteristic in which the current rises (the current falls) until the current value reaches a target current value to be stabilized.

FIGS. 6A to 6C schematically show an example of rising waveforms of the blue laser diode 71 (a light source current waveform). The rising waveforms of the blue laser diode 71 shown are those seen at the building-up timing tup1 in the period T11 at which light in the blue wavelength range starts to be emitted from the excitation light shining device 70 (B-LD) or at the building-up timing tup2 in the period T12 at which the amount of light in the blue wavelength range emitted from the excitation light shining device 70 (B-LD) is increased in FIG. 5.

In FIGS. 6A to 6C, an axis of ordinates denotes a current value of a current by which the blue laser diode 71 is drive, and an axis of abscissas denotes a time (a spoke period Tsp). The blue laser diode 71 has a waveform characteristic represented by varying portions I11, I21, I31 where current values vary until they reach corresponding target current values I12, I22, I32 as shown in FIG. 6A. FIGS. 6A to 6C show current waveforms I1, I2, I3 corresponding to various color modes, and three target current values I12, I22, I32 are shown as target current values of the current waveforms I1, I2, I3 in the order of their increasing current values.

An amount of light of the blue laser diode 71 is calculated by current value and time. The amount of light is calculated by detecting a current value of the blue laser diode 71 by the detection module 56. Thus, as shown in FIG. 6A, when the current value varies as color modes changes, the amount of light in the spoke period Tsp changes. Then, in the case that a projected image emitted via the projection optical system 220 has a gradation, a discontinuous point may be seen in gradation. Then, a timing at which the current value rises (or falls) is controlled, that is, a delay time for a light emitting timing is set (a delay control is performed), so that a variation in the amount of light during the spoke period Tsp is made uniform, whereby the repeatability of gradation can be maintained even though the color modes change.

Figure 7:
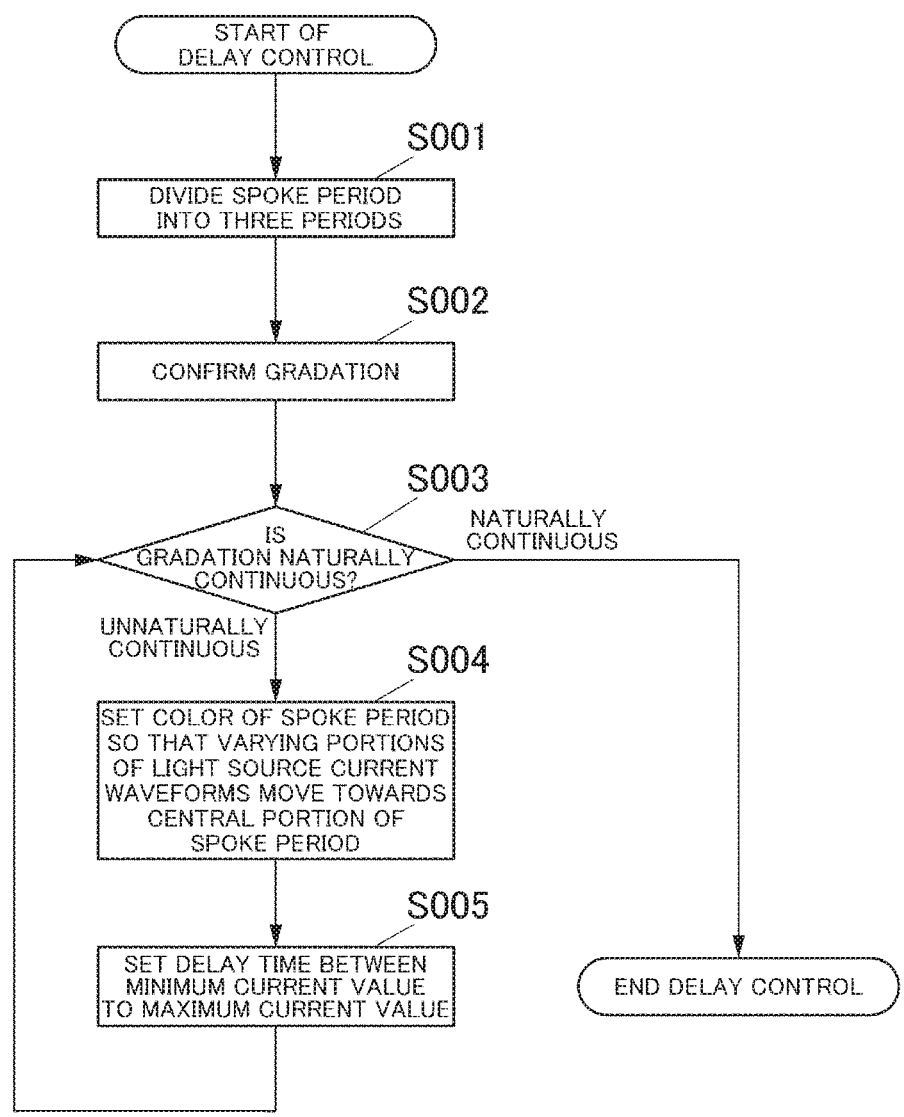
FIG. 7 is a flow chart showing the delay control in the projector according to the embodiment of the present invention.

The delay control is performed in accordance with a flow chart shown in FIG. 7.

Step S001: When the delay control is started, firstly, the spoke period Tsp is divided into three spoke periods by the delay time setting module 54 as shown in FIG. 6A. Here, the spoke period Tsp is divided into three periods Tsp1, Tsp2, Tsp3. For example, in the case that the spoke period Tsp is set at 17 degrees, the spoke period Tsp is divided so that Tsp1 is set at six degrees, Tsp2 at six degrees, and Tsp3 at seven degrees.

Step S002: Next, a gradational image is projected on to a screen via the projection optical system 220, and the gradation is visually confirmed.

Steps S003, S004: When the gradation is continuous unnaturally, the divided spoke periods Tsp1, Tsp2, Tsp3 are caused to vary by the delay time setting module 54 as shown in FIG. 6B, and a color of the spoke period Tsp is set so that the varying portions I11, I21, I31 of the current waveforms move towards a central portion (that is, the period Tsp2) of the spoke period Tsp.

Step S005: A delay time is set between a minimum current and a maximum current by the delay time setting module 54 (that is, a start timing of the color mixing period in which light in the red wavelength range and light in the green wavelength range are mixed up to emit a mixed color of light is shifted). For example, in an example shown in FIG. 6C, a delay time for the current waveform I1 whose target current value I12 is the highest is set at Δt1, a delay time for the current waveform I2 whose target current value I22 is medium is set at Δt2, and a delay time for the current waveform I3 whose target current value I32 is the lowest is set at Δt3.

In this way, as shown in FIG. 6C, irrespective of the heights of the target current values I12, I22, I32, the respective variations in the current waveforms I1, I2, I3 can be made substantially constant from the period Tsp1 to the period Tsp3. Then, the light source driving module 55 drives the light source unit 60 (the light source unit) via the light source control circuit 41 based on the settings that are set by the timing setting module 53 and the delay time setting module 54. Thus, the repeatability of gradation is held in an image projected in the way described above even though the color modes vary.

In this embodiment, the information indicating the amount of blue light emitted from the projection optical system 220 during the spoke period Tsp is detected by measuring the current value of the blue laser diode 71 by the detection module 56. However, the present invention is not limited thereto, and hence, a configuration may be adopted in which the detection module includes an illuminance sensor and detects information indicating an amount of each color of light by measuring an illuminance of a projected image. Additionally, in this embodiment, the delay control is described only on the blue laser diode 71. However, the present invention is not limited thereto, and hence, the delay control can also be executed on the red light emitting diode 121.

A look-up table stored in a storage unit such as an S-RAM connected to the controller 38 or the like can also be used in setting the delay time setting between the minimum current and the maximum current in place of the delay time setting module 54.

As has been described heretofore, according to the embodiment of the present invention, the projector 10 includes the excitation light shining device 70 (the blue laser diodes 71) and the color wheel device 200 (the color wheel 201) and includes further the light source unit 60 constituting a light source unit for emitting the plurality of colors of light including light in the red wavelength range (light in a first wavelength range) emitted from the red light source device 120 and light in the green wavelength range (light in a second wavelength range) emitted from the luminescent wheel device 100 in time division, the delay time setting module 54 for shifting the start timing of the color mixing period when light in the red wavelength range and light in the green wavelength range are mixed up to emit the mixed color of light in the spoke period Tsp on the color wheel 201 which constitutes the period when the emission of light in the red wavelength range and the emission of light in the green wavelength range are switched over based on an index in relation to the brightness of the lights emitted from the light source unit 60, and the light source driving module 55 for driving the light source unit 60 based on the settings set by the delay time setting module 54. As a result, the projector 10 can be provided in which the repeatability of gradation can be maintained even through the color modes are changed.

In addition, the spoke period Tsp is divided into the three spoke periods. As a result, the spoke period Tsp can be varied by switching the delay controls in association with the color mode adopted.

The delay time setting module 54 sets the delay time (shifts the start timing of the color mixing period) so that the varying portions I11, I21, I31 of the pieces of information indicating the respective amounts of the colors of light move towards the central portion of the spoke period Tsp. This can reduce the number of manhours in calibrating the spoke period (the spoke period Tsp3) when the blue laser diode 71 does not vary.

The index for the brightness of light includes the driving current or the temperature of the blue laser diode 71. As a result, the repeatability of gradation can be maintained even though the driving current value of the blue laser diode 71 or the temperature is changed by the use of the blue laser diode 71.

The delay time setting module 54 sets the timings at which the plurality of colors of light that the light source unit 60 emits for the plurality of color modes. As a result, the repeatability of gradation can be maintained even for a color mode in which the light switching timing varies.

The color modes include the brightness-stressed mode in which the brightness of the projected image is stressed and the color-stressed mode in which the tone of the projected image is stressed. As a result, not only can a clear projected image be obtained even in a bright room, but also a projected image can be obtained which is suitable for watching movies or the like.

The start timing of the color mixing period is executed between the minimum current value and the maximum current value of the driving current of the blue laser diode 71. As a result, the gradation is prevented from being varied by the value of the current flowing to the light source, whereby the projector 10 can be provided in which the range of current values where the repeatability of gradation is maintained is wider than the conventional range of current values.

Although the delay time for delaying the light emitting timing in the light source unit that is set by the delay time setting module 54 is set based on the index indicating the brightness of light, the index indicating the brightness of light may not be based on the plurality of color modes but may be based on a brightness set by the user.

Additionally, as long as the delay time for delaying the light emitting timing in the light source unit that is set by the delay time setting module 54 is set based on the index indicating the brightness of light, the delay time may be set based on information other than the information indicating the amount of each color of light (the current value of the driving current of the blue laser diode 71, which is the semiconductor light emitting diode, and the brightness set by the user).

For example, since the semiconductor light emitting element is heated in association with use of the projector whereby the temperature of the semiconductor varies, the delay time may be set based on the temperature of the semiconductor light emitting element. In this way, the delay time setting module can set the delay time every a predetermined time (for example, every 100 μseconds) based on indices indicating various degrees of brightness.

The controller 38 of the projector 10 which is referred to as the projection control device includes the delay time setting module 54, and the light source driving module 55. Then, the controller 38 is caused to function as the delay time setting module 54 and the light source driving module 55 by a storage medium stored in a storage unit such as then S-RAM connected to the controller 38 or the like. As a result, the projection control device and the storage medium can be provided in which the repeatability of gradation can be maintained even though the color modes are changed.

While the embodiment of the present invention has been described heretofore, the embodiment is presented as an example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A projector comprising:
   a light source unit comprising a semiconductor light emitting element and a color wheel and configured to emit a plurality of colors of light including light in a first wavelength range and light in a second wavelength range in time division;
   a display device on to which light source light is shined from the light source unit to form image light;
   a projection optical system configured to project the image light emitted from the display device on to a projection target;
   a delay time setting module configured to shift a start timing of a color mixing period when the light in the first wavelength range and the light in the second wavelength range are emitted in a mixed fashion in a spoke period of the color wheel which constitutes a period when an emission of the light in the first wavelength range and an emission of the light in the second wavelength range are switched over based on an index indicating a brightness of light emitted from the light source unit; and
   a light source driving module configured to drive the light source unit based on a setting set by the delay time setting module,
   wherein the delay time setting module sets a timing at which the plurality of colors of light emitted by the light source unit are switched over for each of a plurality of color modes,
   wherein each of the plurality of colors of light has a different emission level in each of the plurality of color modes so that a different amount of light is emitted for each of the plurality of colors of light in each of the plurality of color modes, and
   wherein the delay time setting module sets three periods for dividing the spoke period into three for adjusting the start timing of the color mixing period by adjusting a delay timing of each of the plurality of colors of light so that a substantially uniform variation in the amount of light is achieved in the three periods for each of the plurality of colors of light in each of the plurality of color modes despite the different amount of light emitted for each of the plurality of colors of light in each of the plurality of color modes.

2. The projector according to claim 1,
   wherein the index indicating the brightness of the light includes a driving current or a temperature of the semiconductor light emitting element.

3. The projector according to claim 1,
   wherein the plurality of color modes includes a brightness-stressed mode in which a brightness of a projected image is stressed and a color-stressed mode in which a tone of a projected image is stressed.

4. The projector according to claim 2,
   wherein setting a start timing for the color mixing period is performed between a minimum current value and a maximum current value of the driving current.

5. A projection control device comprising:
   a delay time setting module configured to shift a start timing of a color mixing period when light in a first wavelength range and light in a second wavelength range are emitted in a mixed fashion in a spoke period of a color wheel which constitutes a period when an emission of the light in the first wavelength range and an emission of the light in the second wavelength range are switched over based on an index indicating a brightness of light emitted from a light source unit comprising a semiconductor light emitting element and the color wheel and configured to emit a plurality of colors of light including the light in the first wavelength range and the light in the second wavelength range in time division; and
   a light source driving module configured to drive the light source unit based on a setting set by the delay time setting module,
   wherein the delay time setting module sets a timing at which the plurality of colors of light emitted by the light source unit are switched over for each of a plurality of color modes,
   wherein each of the plurality of colors of light has a different emission level in each of the plurality of color modes so that a different amount of light is emitted for each of the plurality of colors of light in each of the plurality of color modes, and
   wherein the delay time setting module sets three periods for dividing the spoke period into three for adjusting the start timing of the color mixing period by adjusting a delay timing of each of the plurality of colors of light so that a substantially uniform variation in the amount of light is achieved in the three periods for each of the plurality of colors of light in each of the plurality of color modes despite the different amount of light emitted for each of the plurality of colors of light in each of the plurality of color modes.

6. A non-transitory storage medium that a computer can read, the storage medium being configured to cause the computer to function as: a delay time setting module configured to shift a start timing of a color mixing period when light in a first wavelength range and light in a second wavelength range are emitted in a mixed fashion in a spoke period of a color wheel which constitutes a period when an emission of the light in the first wavelength range and an emission of the light in the second wavelength range are switched over based on an index indicating a brightness of light emitted from a light source unit comprising a semiconductor light emitting element and the color wheel and configured to emit a plurality of colors of light including the light in the first wavelength range and the light in the second wavelength range in time division; and a light source driving module configured to drive the light source unit based on a setting set by the delay time setting module, wherein the delay time setting module sets a timing at which the plurality of colors of light emitted by the light source unit are switched over for each of a plurality of color modes, wherein each of the plurality of colors of light has a different emission level in each of the plurality of color modes so that a different amount of light is emitted for each of the plurality of colors of light in each of the plurality of color modes, and wherein the delay time setting module sets three periods for dividing the spoke period into three for adjusting the start timing of the color mixing period by adjusting a delay timing of each of the plurality of colors of light so that a substantially uniform variation in the amount of light is achieved in the three periods for each of the plurality of colors of light in each of the plurality of color modes despite the different amount of light emitted for each of the plurality of colors of light in each of the plurality of color modes.

* * * * *